DOUBLE FREQUENCY DETECTION SYSTEM

Filed Dec. 21, 1964

INVENTORS
MARTIN O. HALFHILL
HAROLD C. STEPHENS
BY
Robert B. Crouch
ATTORNEY

United States Patent Office

3,405,391
Patented Oct. 8, 1968

3,405,391

DOUBLE FREQUENCY DETECTION SYSTEM

Martin O. Halfhill and Harold C. Stephens, San Jose, Calif., assignors to International Business Machines Corporation, New York, N.Y., a corporation of New York Filed Dec. 21, 1964, Ser. No. 419,797
5 Claims. (Cl. 340—167)

ABSTRACT OF THE DISCLOSURE

A playback system for reading out magnetically recorded double frequency coded data includes timing and delay circuitry for detecting and separating the clock bits from the data bits.

The present invention relates to magnetic recording and more particularly to means for detecting binary signals recorded with a double frequency technique.

In saturation-type magnetic recording, binary signals are usually recorded by a reversal of the magnetic flux, i.e., by effecting a step-like change in magnetization from one remanent state of saturation of the recording medium to the opposite state. The flux reversals, or bits, are recorded in a timed sequence in synchronism with a series of regularly occurring clock signals. The frequency of the clock signals controls the rate at which the signals are recorded onto or read from the recording medium and also defines the clock interval, that is, the time period between adjacent clock signals. Double frequency recording is a saturation-type recording technique which is self-clocking, i.e., there is at least one flux reversal or bit recorded per clock interval. In a double frequency recording system, a clock bit occurs for every clock interval and an additional data bit is either present or absent depending upon the binary value of the data recorded during that clock interval. This technique is also defined as one in which data of a first binary value is indicated by a single bit during a clock interval and data of a second binary value is indicated by two bits within a clock interval. To facilitate the readout process, it is desirable to achieve the maximum separation (one-half the clock interval) between bits. This, in practice, results in a clock bit at the beginning of every clock interval and a data bit at the midpoint of each clock interval having a second binary value.

The readout process of double frequency recorded signals requires identification of the various signals as either clock or data then separation of the data signals from the clock signals, and finally synchronization of one with the other. This process is complicated by the problem of bit shift, i.e., the tendency of either the clock or the data bits to be shifted from their assigned location toward or away from an adjacent bit. Since both the amount and the direction of this shift are irregular and variable, the task of distinguishing the data signals from the clock signals becomes exacting.

The object of the present invention is to provide a means for detecting double frequency recorded signals which is both accurate and economical and which involves a minimum of circuit components.

The above object is realized in the present invention by the provision of circuitry for detecting and separating the clock and data bits in double frequency recorded signals. This circuitry includes a delay mechanism and two timing circuits. The signals read from the recording medium are applied to the first timing circuit which detects those clock intervals in which a data bit does not occur. The read signals are also applied through the delay mechanism to the second timing circuit which detects only the first signal in each clock interval, i.e., the clock bit. The outputs of the two timing circuits are applied along separate lines, i.e., the data line and the clock line. The first timing circuit is also connected to the second timing circuit in order to synchronize the clock signals with the data signals.

Other objects and many of the attendant advantages of this invention will be readily appreciated as the same becomes better understood by reference to the following detailed description of a preferred embodiment of the invention as illustrated in the accompanying drawings, wherein.

Figure 1:
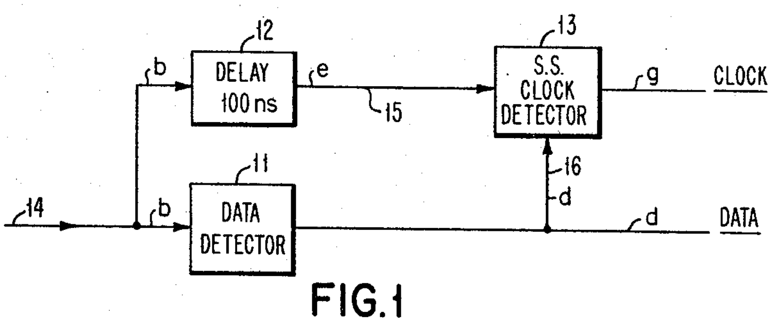
FIG. 1 is a schematic diagram of the logic circuitry employed in the present invention.

The detection circuitry illustrated in FIG. 1 is intended to be connected to an output of a magnetic read circuit to receive the raw read signals from the magnetic medium. This circuit includes a data detector timing circuit 11 which is connected in parallel with a delay mechanism 12 and a clock detector timing circuit 13. Raw read signals are supplied along a line 14 to an input of the data detector and of the delay mechanism. The data detector 11 is a timing circuit of the type shown in FIG. 3, that is reset by each signal occurring on the input line 14. The delay mechanism may be any suitable means, such as a capacitor, monostable multivibrator, etc., that will pass each of the signals on the input line 14 with a uniform delay. The clock detector 13 is a monostable multivibrator of the type that is set by the first signal occurring on line 15 from the delay mechanism and which will then ignore any further signals on line 15 until it has timed out. The clock detector however can be reset before it has timed out by a signal on line 16 from the data detector 11.

Figure 2:
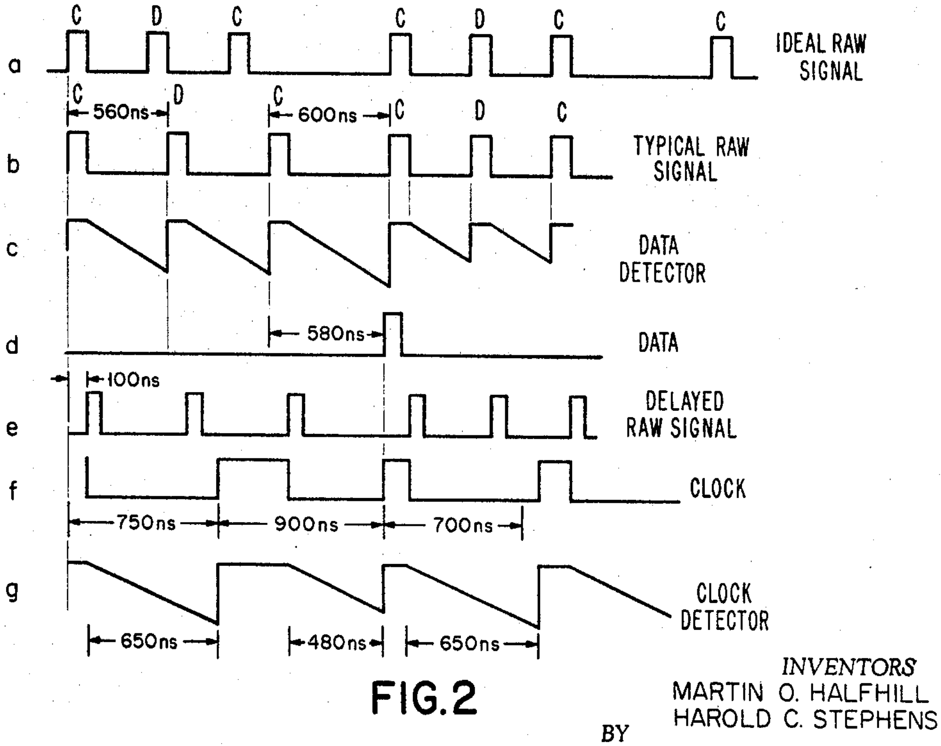
FIG. 2 shows a series of waveforms illustrating the relationship of signals in the different portions of the circuit of FIG. 1.

Referring to the waveforms of FIG. 2, waveform *a* illustrates the ideal double frequency read signals. In this waveform the clock bits C occur at a uniform frequency of 800 nanoseconds. The data bits D occur at the midpoints of the appropriate clock intervals, i.e., 400 nanoseconds after the first clock bit and 400 nanoseconds before the next clock bit. Typical raw read signals are illustrated in waveform *b*. As shown, the clock bits do not occur at a uniform frequency of 800 nanoseconds and the data bits may or may not occur 400 nanoseconds after the first clock bits of the clock interval. A clock bit which follows a data bit, but which is not in turn followed by a data bit, may be shifted toward the following clock bit due to pulse crowding effects, etc. Likewise, a data bit may be shifted away from the preceding clock bit by a variety of effects, including distortion in reading, cumulative inaccuracies in the read/write circuit components, transducer tolerances, etc. These two conditions are representatives of bit shift and are depicted in the first and second clock intervals of waveform *b*. For the sake of the present explanation, it is assumed that the numbers shown on waveform *b* represent the maximum amount of bit shift, i.e., the maximum spacing between a data bit and the preceding clock bit will not exceed 560 nanoseconds, while the minimum spacing between two adjacent clock bits will never be less than 600 nanoseconds. In this example, the data detector is provided with a decay period which is greater than the maximum period between clock and data bits and less than the minimum period between adjacent clock bits, in this case 580 nanoseconds. Waveform *b* is applied to the data detector which is set by the leading edge of each pulse of waveform *b*. This characteristic of the data detector is illustrated in waveform *c*. Since the maximum time between adjacent clock and data pulses in waveform *b* is 560 nanoseconds, the data detector will continue to be reset before the expiration of the 580 nanosecond period as long as there is a data pulse between adjacent clock pulses of waveform *b*. Since the minimum time period between adjacent clock pulses of waveform *b* when there is no data pulse, is 600 nanoseconds, the data detector will fire before it is reset by the second clock pulse. This sequence is shown in waveforms *c* and *d*. As illustrated in waveform *d*, a data pulse is provided by the data detector for every clock interval in which a data bit does not appear.

The raw read signals of waveform *b* are also applied to delay mechanism 12 which delays each pulse 100 nanoseconds as shown in waveform *e*. Waveform *e* is then applied along line 15 to the clock detector 13. The clock detector is provided with a decay period of 650 nanoseconds which is greater than the maximum period between clock and data bits and less than the normal clock interval (800 nanoseconds). The clock detector is set by the leading edge of each clock pulse in waveform *e*. After it is set, the clock detector times out and ignores the data pulses of waveform *e*, since the decay period of the clock detector exceeds the maximum period (560 nanoseconds) between the clock and data pulses of waveform *e*. This characteristic of the clock detector is illustrated in waveform *f*. In order to synchronize the detected clock signals with the detected data signals, the data signals of waveform *d*, are used to reset the clock detector before the end of the clock detector decay period. This is shown in waveform *f*. Accordingly, as shown in waveform *g*, the clock detector provides a clock signal whenever it is fired, that is, either 650 nanoseconds after each delayed clock pulse of waveform *e* or upon the occurrence of a data pulse on line 16 from the data detector. The clock detector is thus resynchronized with every data signal to provide a fixed relationship between the data signals and the clock signals.

Figure 3:
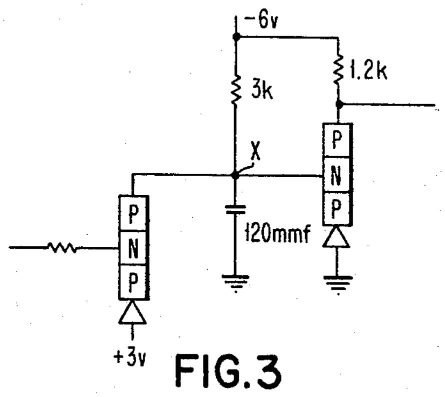
FIG. 3 is a diagram of a timing circuit suitable for use in the circuitry of FIG. 1.

The timing circuit of FIG. 3 includes a switch, a ramp generator and a voltage detector. The ramp generator consists of a 3K resistor and a 120 mmf. capacitor in series between −6 volts and ground. A transistor switch is connected between the capacitor and +3 volts, so that each pulse of waveform *b* at the base of the switch causes it to conduct, driving point X to +3 volts. When the switch is cut off by the trailing edge of the pulse, the capacitor starts to charge through the 3K ohm resistor towards −6 volts, thus generating a ramp as shown in waveform *c*. When point X is at 3 volts, the transistor voltage detector is cut off. As the capacitor charges, the voltage detector will conduct at a base voltage of slightly below 0 volts. Because of the low base resistance (3K) the transistor voltage detector becomes fully conductive almost immediately, thereby producing a square output, waveform *d*, from the collector.

There is no requirement for precise accuracy of the delay mechanism 12, the only necessity being that it must be consistent, i.e., it must delay each pulse of waveform *a* a uniform amount. The delay mechanism is employed to provide a minimum width pulse in waveform *g*. This allows reasonable tolerances in the clock detector by permitting a minimum time, equal to the delay, for the detector to stabilize between the time it is reset by waveform *d* and then set by waveform *e*.

The present invention provides a self-synchronizing clock and data detector which does not require any format signals to be written ahead of the recorded data. The disclosed circuitry requires only one clock interval of a first binary value at the beginning of each record for the clock detector to synchronize on the clock bits in the record.

The invention has been particularly shown and described with reference to a preferred embodiment, however, modifications and variations of the invention are possible in light of the above teachings. It is therefore understood that within the scope of the appended claims, the invention may be practiced otherwise than as specifically described.

What we claim is:

1. Detection circuitry for double frequency recorded binary signals which include a clock bit at the beginning of each clock interval the first binary signal characterized by the absence of a data bit, and the second binary signal characterized by a data bit at the midpoint of each clock interval including:

a read line carrying double frequency recorded signals as read from a magnetic medium;

first means connected to the read line for detecting the clock intervals of a first binary value;

second means operatively connected to the read line for detecting the clock bit in each clock interval; and means for synchronizing the outputs of the first and second means.

2. Detection circuitry for double frequency recorded binary signals which include a clock bit at the beginning of each clock interval and a data bit at the midpoint of each clock interval of a second binary value, including:

a read line carrying double frequency recorded signals as read from a magnetic medium;

first means connected to the read line for detecting the clock intervals in which a data bit does not occur;

second means operatively connected to the read line for detecting the first bit in each clock interval; and means for synchronizing the output of the second means with the output of the first means.

3. Detection circuitry for double frequency recorded binary signals which include a clock bit at the beginning of each clock interval and a data bit at the midpoint of each clock interval of a second binary value, including:

a read line carrying double frequency recorded signals as read from a magnetic medium;

first means connected to the read line for detecting the clock intervals in which a data bit does not occur;

a delay mechanism connected to the read line;

second means connected in series with the delay mechanism for detecting the first bit in each clock interval; and means for synchronizing the output of the second means with the output of the first means.

4. Detection circuitry for double frequency recorded binary signals which include a clock bit at the beginning of each clock interval and a data bit at the midpoint of each clock interval of a second binary value, including:

a read line carrying double frequency recorded signals as read from a magnetic medium;

a first timing circuit connected to the read line for detecting the clock intervals in which a data bit does not occur;

a delay mechanism connected to the read line;

a second timing circuit connected in series with the delay mechanism for detecting the first bit in each clock interval; and a connection between the first and second timing circuits for synchronizing the output of the second timing circuit with the output of the first timing circuit.

5. Detection circuitry as defined in claim 4 wherein:

the first timing circuit is of the type that is reset by each signal on the read line; and the second timing circuit is of the type that is set by the first signal on the read line and is undisturbed by further signals on the read line until it has timed out.

(References on following page)

References Cited

UNITED STATES PATENTS

| | | | |
|---|---|---|---|
| 2,807,003 | 9/1957 | Alrich ---------- | 340—167 XR |
| 3,020,523 | 2/1962 | Ridler et al. | |
| 3,048,831 | 8/1962 | Sharp. | |
| 3,108,265 | 10/1963 | Moe. | |
| 3,300,578 | 1/1967 | Davis et al. ------ | 340—167 XR |

OTHER REFERENCES

"High-Density Recording on Magnetic Tape," Electronics, pp. 72–75, Oct. 16, 1959.

JOHN W. CALDWELL, *Primary Examiner.*

D. J. YUSKO, *Assistant Examiner.*